United States Patent [19]
Johnson

[11] 3,734,369
[45] May 22, 1973

[54] WELDING FILLER MATERIAL FEED APPARATUS

[76] Inventor: Robert P. Johnson, 7237 South 129th Street, Seattle, Wash. 98178

[22] Filed: Nov. 1, 1971

[21] Appl. No.: 194,296

[52] U.S. Cl. ................... 226/134, 226/182, 226/200
[51] Int. Cl. ............................................. B65h 17/20
[58] Field of Search ..................... 226/134, 152, 182, 226/200, 184

[56] References Cited

UNITED STATES PATENTS

| 3,396,888 | 8/1968 | Rygiol | 226/134 |
| 3,396,891 | 8/1968 | De Jong | 226/184 |

*Primary Examiner*—Richard A. Schacher
*Attorney*—John W. Kraft

[57] ABSTRACT

The welding filler material feeding apparatus of the present disclosure comprises a filler wire guide, a driving box, and electric control means to selectively control the flow of material from the driving box. The filler wire guide includes a flexible conduit provided at one of its terminal ends with a rigid barrel and a tip on the rigid barrel, the tip being tapered toward its terminal end opposite the barrel engaging end. The driving box is attached at one of its terminal ends to the terminal end of the flexible conduit. The drive box includes a drive means comprising a motor having a motor wheel with a concave curved groove and suitable spur gear-like teeth at one of its terminal ends and having an idle wheel provided parallelly directly over the motor wheel, with a concave curved groove and a complementary set of spur gear-like teeth operable to engage the motor wheel gear teeth; and a spindle operable to receive a spool of filler wire disposed in the box.

2 Claims, 4 Drawing Figures

Patented May 22, 1973
3,734,369
2 Sheets-Sheet 1
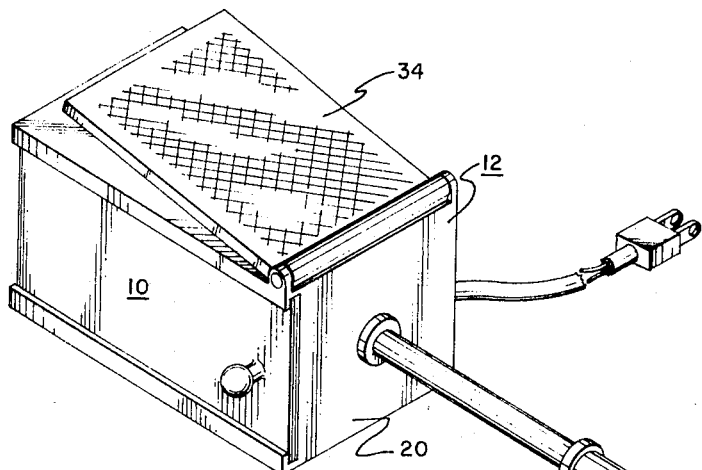
FIG. 1
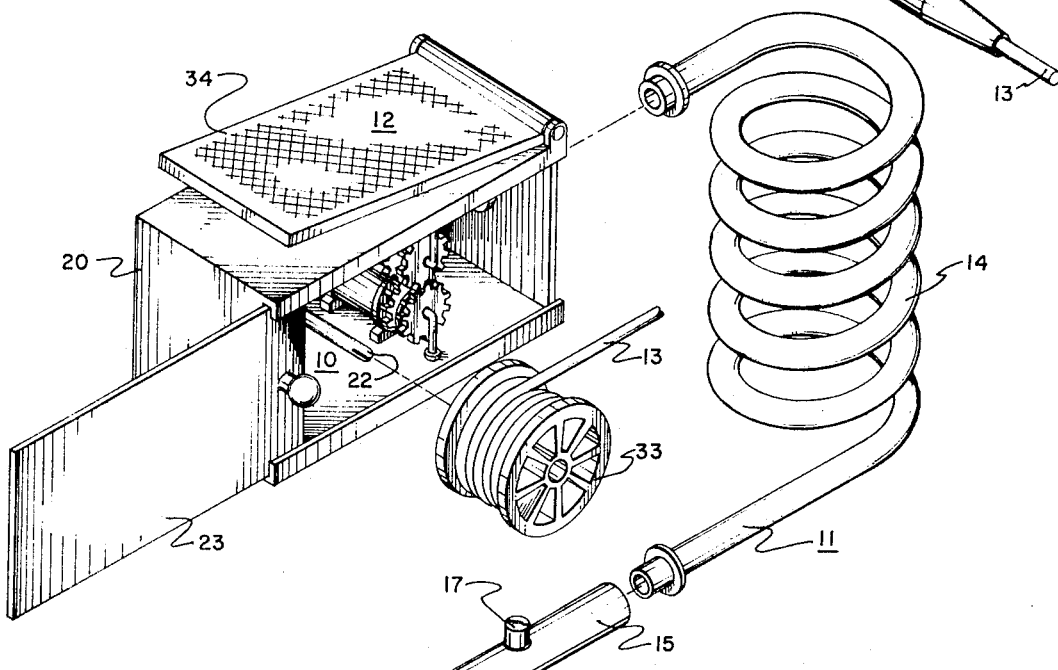
FIG. 2
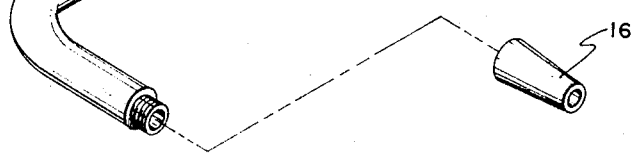
ROBERT P. JOHNSON  INVENTOR.
BY Patented May 22, 1973

ROBERT P. JOHNSON   INVENTOR.

BY John W. Kraft

WELDING FILLER MATERIAL FEED APPARATUS

FIELD OF INVENTION

The present invention relates to an apparatus for feeding welding filler material, and more particularly to a selectively controllable feeding apparatus for dispensing welder filler material.

DESCRIPTION OF THE PRIOR ART

Filler material as commonly used and employed is generally a wire-like material which may be packaged in predetermined lengths, as rods, or in spools. Filler material is generally used by bringing the filler material into contact with a suitable source of welding heat. The means for feeding the material to the welding work includes mechanical feeding means and hand feeding means. Generally, mechanical feeding means comprise motor-driven apparatus which pulls filler material from a spool at a preselected rate. The driving means may either feed continuously or be actuated as the welding torch is turned on and off in the course of the welding work. Generally, to stop the flow of filler, the torch must be stopped. Hand feeding means generally involve the use of lengths of filler material cut into welding rods held in the hand of the welder. Hand feeding of filler material requires dexterity, and subjects the welder to risk of injury.

Accordingly, it is an object of the present invention to mechanically feed filler material by an selectively controllable apparatus.

It is a further object of this invention to provide selectively controllable mechanical filler material feeding means which is operable to feed large diameter welding filler material, such as filler material used in TIG welding processes.

These and other objects shall become apparent from the description following, it being understood that modifications may be made without affecting the teachings of the invention here set out.

SUMMARY OF THE INVENTION

Generally, the welding filler material feeding apparatus of the present invention comprises a filler wire guide, a driving box, and electric control means to selectively control the flow of material from the driving box. The filler wire guide includes a flexible conduit provided at one of its terminal ends with a rigid barrel and a tip on the rigid barrel, the tip being tapered toward its terminal end opposite the barrel engaging end. The driving box is attached at one of its terminal ends to the terminal end of the flexible conduit. The drive box includes a drive means comprising a motor having a motor wheel with a concave curved groove and suitable spur gear-like teeth at one of its terminal ends and having an idle wheel provided parallelly directly over the motor wheel, with a concave curved groove and a complementary set of spur gear-like teeth operable to engage the motor wheel gear teeth; and a spindle operable to receive a spool of filler wire disposed in the box.

A more thorough and comprehensive understanding may be had from the detailed description of the preferred embodiment when read in connection with the drawings forming a part of this specification.

BRIEF DESCRIPTION OF THE DRAWINGS

FIG. 1 is a left front perspective view, as seen from above, of the welding filler material feed apparatus of the present invention.

FIG. 2 is a left rear perspective exploded view of the driving box assembly, the wire drive spool, and the filler wire guide means.

DETAILED DESCRIPTION OF THE PREFERRED EMBODIMENT

Figure 3:
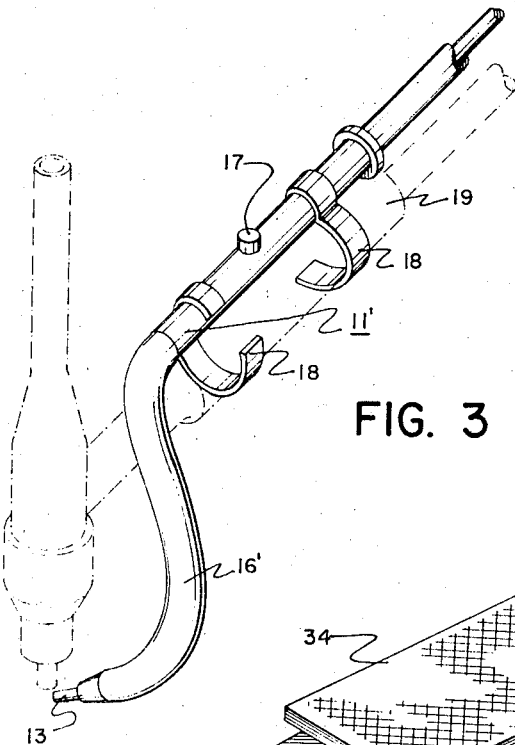
FIG. 3 is a right front perspective fragmentary view of the filler wire guide means and guide clamp means disposed on a typical welding torch, shown in broken lines for illustrative purposes.

Referring now to the drawings, and more particularly to the FIG. 1, the welding filler material feeding apparatus of this invention is shown to advantage and identified by the numeral 10. The filler feeding apparatus 10 generally comprises a filler wire guide means 11 and a driving box assembly 12. The wire guide means 11 is operable to guide filler wire 13 from the box 12 to the welding zone. The driving box assembly 12 generally provides means for storing and actuating spool-packaged filler wire.

Referring now to the FIG. 2, the guide 11 includes a flexible conduit 14, a rigid barrel portion 15, and a tip 16. The flexible conduit 14 may be suitably connected at one of its terminal ends to one of the terminal ends of the driving box assembly 12. The flexible conduit 14 is operable to articulatingly carry filler wire 13. The flexible conduit 14 may be fabricated of any number of commonly known flexible cable housing-like conduits. The flexible conduit 14 is provided at its terminal end opposite the driving box 12 with a substantially rigid barrel portion 15. The barrel portion 15 may be a hollow cylinder shell operable to provide a rigid handle by which the welder can direct the flow of filler wire 13 into the welding zone. The barrel portion 15 may be provided with a control switch 17 operable to control the driving box assembly 12, hereinafter later described. The barrel 15 may include welding torch fastening clamps 18 operable to secure the barrel 15 to a commonly known welding torch 19, shown more clearly in the FIG. 3. The terminal end of the barrel 15 opposite its flexible conduit engaging end is provided with a tip 16. The tip 16 is a cylinder, tapered toward its terminal end, operable to closely conform to the circumference of the filler wire 13 and to more accurately guide the filler wire 13 into the welding zone. As shown by the FIG. 3, a welding-torch-mounted wire guide 11' may be provided with a curved tip 16' operable to guide the filler wire 13 into the welding zone at a predetermined angle and location.

Figure 4:
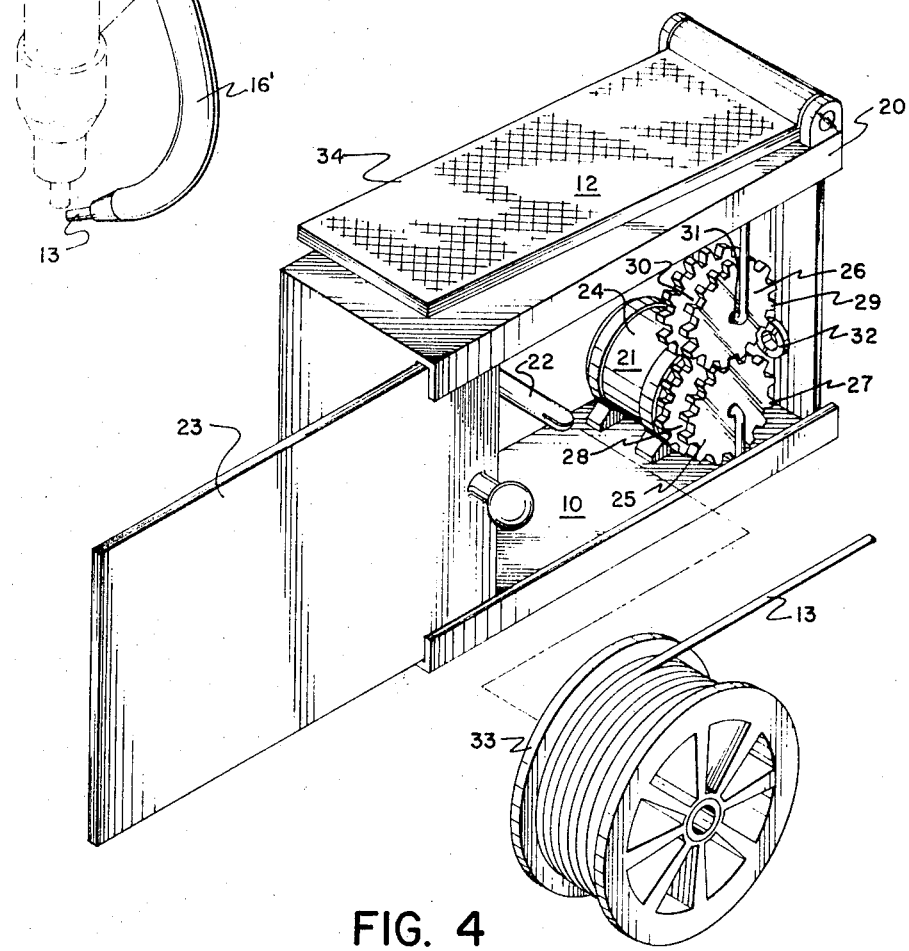
FIG. 4 is a left rear perspective view of the driving box assembly, drawn to a larger scale, and a typical wire drive spool exploded from the driving box.

Referring now to the FIG. 4, the driving box assembly 12 comprises a box portion 20, a wire driving assembly means 21, and a spindle 22. The box 20 is a suitably configured closed container provided with an access door 23 operable to protect wire stored in the box 20 and the driving means 21. The driving means 21 comprises a motor 24, a motor wheel 25, and an idle wheel 26. The motor wheel 25 is attached to the commonly known motor 24. The motor wheel 25 is provided with a set of spur gear-like driving teeth 27 at its circumferential terminal edges. The motor wheel 25 is provided with a groove 28 having a concave curve with respect to the wheel 25. The idle wheel 26 is provided with a complementary set of spur gear-like teeth 29 engageable with the teeth 27 of the motor wheel 25. The idle wheel 26 is likewise provided with a concave groove 30. The idle wheel 26 is disposed on a axle 31 fastened to the box 20 parallelly directly over the motor wheel 25. The axle 31 of the idle wheel 26 is suitably fastened to the box 20 at a distance from the shaft of the motor 24 of the motor wheel 25. That is to say, the wheels 25 and 26 are juxtapositioned to securely frictionally engage the wire 13. A hole 32 is provided in one of the terminal ends of the box 20 at a level suitable to permit the wire 13 to travel between the wheels 25 and 26 and out of the hole 32. The hole 32 may be provided with bushings operable to reduce wear of the filler wire 13 passing through the terminal end wall of the box 20 and to attach the wire guide 11. It is to be understood that the direction of rotation of the motor 24 is operable to direct wire 13 carried in the driving box assembly 12 through the terminal hole 32 and out of the box 20. Wire 13 is stored in the box 20 on a spool 33 provided with a spindle 22. The box 20 is provided with a fixedly mounted spindle 22 suitable to receive and retain the spool 33. The spindle 22 should be disposed at a suitable level to permit wire 13 to be drawn from the spool 33 and through the wheels 25 and 26 in a straight horizontal path.

As shown by the FIG. 2, the motor 24, selectively controlled by a control switch 17, may be operable to be selectively controlled by the welder. In practice it has been found to advantage to include a pedal-type switch 34 on the box 20 operable to be selectively depressed by the welder, as shown to advantage in the FIG. 4.

In operation, a spool 33 of filer wire 13 is disposed on the spindle 22, and is threaded between the wheels 25 and 26 in the respective grooves 28 and 30 and out of the hole 32. The filler wire 13 may be selectively fed to the zone of welding by depressing the control switch 17 or the pedal switch 34. By releasing the control switch 17 or the pedal switch 34, the welding torch 19 can continue to heat the zone of welding while the filler wire 13 is not being fed to the zone.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A welding filler material feeding apparatus, comprising
    a filler wire guide means including a flexible conduit, a rigid barrel provided at one of the terminal ends of said flexible conduit, and a tip mounted on said rigid barrel, said tip being tapered toward its terminal end opposite said barrel;
    a driving box attached at one of its terminal ends to the terminal end of said flexible conduit, said driving box including a drive means comprising a motor having a motor wheel with a concave curved groove and suitable spur gear-like teeth on one of its terminal edges and having an idle wheel juxtapositioned to said motor wheel, said idle wheel including a concave curved groove and a complementary set of spur gear-like teeth operable to engage said motor wheel gear-like teeth, and a spindle operable to receive a spool of filler wire disposed in said box; and
    a selectively actuated electric control means in communication with said motor.

2. The apparatus of claim 1, including clamp means provided on said barrel operable to secure said barrel to a commonly known welding torch and a tip operable to dispense filler wire to the welding zone of said welding torch at a predetermined angle and location with respect to said torch.

* * * * *